(12) United States Patent
Loane

(10) Patent No.: US 12,529,695 B2
(45) Date of Patent: Jan. 20, 2026

(54) FENTANYL ANALOGUE DETECTION METHODS AND KITS THEREOF

(71) Applicant: Veriteque USA, Inc., Carson City, NV (US)

(72) Inventor: Christian Loane, Carson City, NV (US)

(73) Assignee: Veriteque USA, Inc., Carson City, NV (US)

( * ) Notice: Subject to any disclaimer, the term of this patent is extended or adjusted under 35 U.S.C. 154(b) by 887 days.

(21) Appl. No.: 17/770,623

(22) PCT Filed: Oct. 21, 2020

(86) PCT No.: PCT/US2020/056613
§ 371 (c)(1),
(2) Date: Apr. 21, 2022

(87) PCT Pub. No.: WO2021/081063
PCT Pub. Date: Apr. 29, 2021

(65) Prior Publication Data
US 2022/0390439 A1 Dec. 8, 2022

Related U.S. Application Data

(60) Provisional application No. 63/000,295, filed on Mar. 26, 2020, provisional application No. 62/923,983, filed on Oct. 21, 2019.

(51) Int. Cl.
*G01N 33/52* (2006.01)
*G01N 33/94* (2006.01)

(52) U.S. Cl.
CPC ....... *G01N 33/521* (2013.01); *G01N 33/9486* (2013.01)

(58) Field of Classification Search
CPC ...... G01N 31/22; G01N 33/52; G01N 33/521; G01N 33/9486
See application file for complete search history.

(56) References Cited

U.S. PATENT DOCUMENTS 4,061,464 A   12/1977  Hahnke et al.
5,178,831 A * 1/1993  Sakota ................ G01N 33/521
                                              435/805

(Continued)

FOREIGN PATENT DOCUMENTS

CN   101558301 A      10/2009
EP   0 800 650 B1 * 12/1995  ............. G01N 33/94
WO   2008/075216 A1   6/2008

OTHER PUBLICATIONS

Sigma-Alrich Sudan Red 7B data sheet (Year: 2025).*

(Continued)

*Primary Examiner* — Jennifer Wecker
*Assistant Examiner* — Jonathan Bortoli
(74) *Attorney, Agent, or Firm* — Gavrilovich, Dodd & Lindsey LLP

(57) ABSTRACT

A portable detection kit for identifying the presence of narcotic compounds (NCs) includes at least one chemical dye, a catalytic reagent, at least one solvent, and a least one surfactant. The at least one dry chemical dye is configured to undergo physic-chemical interaction with at least one predetermined NC to produce a color visible change. The at least one predetermined NC is selected from the group consisting of fentanyl analogues (FAs) and narcotics containing nitrogen heterocyclic moiety.

16 Claims, 6 Drawing Sheets

(56) References Cited

U.S. PATENT DOCUMENTS

| | | | |
|---|---|---|---|
| 5,480,791 A * | 1/1996 | Fujita | C12Q 1/6816 |
| | | | 435/6.12 |
| 6,133,040 A | 10/2000 | Glattstein | |
| 9,759,733 B1 | 9/2017 | Callahan | |
| 10,330,603 B1 | 6/2019 | Callahan | |
| 2005/0191704 A1 | 9/2005 | Boga et al. | |
| 2008/0145949 A1 | 6/2008 | Song et al. | |
| 2010/0170852 A1 | 7/2010 | Suh et al. | |
| 2011/0117664 A1 * | 5/2011 | Amisar | G01N 31/22 |
| | | | 436/164 |
| 2014/0227796 A1 | 8/2014 | Gold et al. | |
| 2015/0297485 A1 | 10/2015 | Kleinen et al. | |
| 2016/0160262 A1 | 6/2016 | Harry et al. | |
| 2018/0306825 A1 | 10/2018 | Hall et al. | |
| 2018/0321212 A1 * | 11/2018 | Letourneau | G01N 33/9426 |

OTHER PUBLICATIONS

Valle de Bairros . Determination of ketamine, norketamine and dehydronorketamine in urine by hollow-fiber liquid-phase microextraction using an essential oil as supported liquid membrane. Forensic Sci Int. Oct. 2014;243:47-54. doi: 10.1016/j.forsciint.2014.04.016. Epub (Year: 2014).*

Krishnamachryulu (Sudan Dyes in Foods) (Year: 2025).*

International Search Report and Written Opinion corresponding to International Patent Application No. PCT/US2020/056613 dated Jan. 8, 2021 (11 pages).

Pinheiro Vieira, E., Extended European Search Report, Application No. 20879793.6, European Patent Office, Nov. 6, 2023.

Office Action, China National Intellectual Property Administration, Application No. 202080089134.9, Jun. 3, 2024.

* cited by examiner

FENTANYL ANALOGUE DETECTION METHODS AND KITS THEREOF

CROSS-REFERENCE TO RELATED APPLICATIONS

This application is a U.S. National Stage application of International Patent Application No. PCT/US2020/056613, filed on Oct. 21, 2020. International Patent Application No. PCT/US2020/056613 claims the benefit of U.S. Provisional Patent Application No. 62/923,983, filed on Oct. 21, 2019, entitled "Fentanyl Analogue Detection Methods and Kits Thereof," and U.S. Provisional Patent Application No. 63/000,295, filed on Mar. 26, 2020, entitled "Fentanyl Analogue Detection Methods and Kits Thereof," the entirety of each of these applications is incorporated by reference.

FIELD OF THE INVENTION

This disclosure generally relates to Fentanyl analogue detection methods and kits thereof.

BACKGROUND

Currently it is estimated there are approximately 540 identified Fentanyl Analogues (FA's) in global circulation, derived from both legal and clandestine sources. In 2006 clandestine laboratories in Mexico where identified as the source of FAs mixed with Heroin product, to which some 1000 fatalities were attributed[1]. Since this time, overdose fatality rate has steadily increased and quadrupled since 2013[1]. FAs are extremely potent opioids. Reportedly, hundreds to many tens of thousands of times the power of morphine. Historically, China has led the world in clandestine manufacture of FAs, with unregulated manufacture occurring until 2015[1]. FAs are highly lipophilic allowing rapid transfer across the skin dermal barrier. First responders overdosing on FAs during the course of performing their duty, unwittingly coming into contact with airborne FAs or touching suspect white powder residues have been reported[1].

Commercially available FAs detection devices are limited and are generally laboratory based systems. Small field deployable devices do exist, for example, company websites including but not limited to DanceSafe.org, BunkPolice.com and BTNX.com.

Thus, new methods for detection of FA analogues are needed.

SUMMARY OF THE INVENTION

Provided herein, inter alia, are methods and kits for detecting Fentanyl analogues (FAs) and other drugs. The present disclosure relates to a portable test kit capable of identifying the presence of FAs and other specific drugs in suspect residue(s), a process to cheaply mass produce the portable test kit and achieve long term commercial shelf life in the range of 1 to 5 years and a method to use the portable test kit.

The present disclosure provides a design for a low cost, mass producible, field deployable, spot test kit which will facilitate identification of FAs and other specific drugs within suspect solid, gel, or liquid residues, while minimizing operator exposure.

It is a further objective of this invention to design both a kit, constructed of simple paper and cotton swab products or wipes, with all color change reagents supplied in this format, constructed of non-hazardous materials and components.

In other embodiments, this invention provides for a design of a portable test kit, which has low cost, mass manufacture capability, in the order of millions of units per annum, while achieving commercial kit shelf life, in the order of several years and a reduced false detection rate.

In embodiments, the portable test kit described herein includes a pre-wetted swab comprising the components described herein. In other examples, the portable test kit comprises dropper spray bottles comprising the components described herein. For example, all the dry formants may be multi-component (e.g., dry strip and the pre-wetted swab).

In other aspects, the present disclosure provides for methods of kit manufacture and use.

In an embodiment, a portable detection kit for identifying the presence of one or more predetermined Narcotic Compounds (NCs) is provided (e.g., one or more of FAs, heroin, cocaine, amphetamine(s), or nicotine). In further embodiments, a method for producing the kit portable detection kit is provided. In additional embodiments, a method of using the portable detection kit is provided.

In an embodiment, the kit includes at least one chemical dye, a catalytic reagent, at least one solvent, and at least one surfactant. The at least one dry chemical dye is configured to undergo physic-chemical interaction with the at least one predetermined NC to produce a color change. As an example, the physic-chemical interaction can produce structural changes to both the at least one dry chemical dye and the at least one NC, ion-pairing interactions and chromic shift phenomena, resulting in a visible color change also known as a presumptive colorimetric indication. Via inter molecular forces, covalent bonding and/or hydrogen bonding, the two molecules of an ion-pair effectively become one molecule, thereby creating structural conformational changes to lowest energy state, which changes the electron distribution throughout the molecule, which in turn absorbs and reflects light of differing wavelengths, and thus the way visible color changes.

In an embodiment, the one or more predetermined NC is selected from the group consisting of fentanyl analogues (FA's) and narcotics containing nitrogen heterocyclic moiety. In further embodiments, the one or more predetermined NCs can be one or more of FAs, heroin, cocaine, amphetamine(s), or nicotine.

In an embodiment, at least two of the at least one chemical dye, the catalytic reagent, the at least one solvent, or the at least one surfactant are separated from one another within the kit. As an example, as separate dry powder(s) and solvents(s) and surfactant(s).

In an embodiment, at least two of the at least one chemical dye, the catalytic reagent, the at least one solvent, or the at least one surfactant are combined together in a solution or homogeneous suspension. As an example, mixed together in any combination as dissolved solution(s) or homogenized suspension.

In another embodiment, the portable detection kit can further included packaging or containers or support articles. The physical embodiment of the kit and its components can be provided in individual hermetically sealed light, air and moisture proof packaging for ease in transport, handling, and long term storage prior to use.

In an embodiment, the at least one dry chemical dye is configured to undergo physic-chemical interaction with the at least one predetermined NC in the form of liquids, gels, or solid powders that are pure or admixed with clandestine cutting or diluting agents. For example, clandestine cutting agents may include any products easily obtained (e.g., by criminals), which appear similar in color and appearance of the pure form narcotics and in order to increase profits the criminal organizations mix the cutting agents or diluting agents to bulk out the narcotic product. Cutting agents may include but not limited to bicarbonate of soda, flour, nutmeg, salt, sugar, methylsulfonylmethane (msm), baby powder, borax, etc.

In an embodiment, chemical dye is selected from Phthalein dyes. For example, the Phthalein dye is selected from the group consisting of tetrabromophenolphthalein ethyl ester (TBPPEE) or its salts.

In an embodiment, chemical dye without is a diazonium dye. For example, the diazonium dye is 4-bromobenzene diazonium tetrafluoroborate or 4-nitrobenzene diazonium tetrafluoroborate.

In examples, the catalytic reagent increases the rate of appearance of the color change (e.g., colorimetric indication) resulting from interaction between the chemical dye and the at least one predetermined NC. For example, the dry catalytic reagent speeds up the color development (e.g., enhances the colorimetric indication).

In an embodiment, the catalytic reagent is selected from the group consisting of sodium bicarbonate, sodium tetraborate, calcium carbonate, sodium hydroxide, citric acid, salts of organic acids, (e.g., citric acid, toluenesulfonic acid, oxalic acid, benzoic acid, ascorbic acid, tartaric acid), ionic and non-ionic natural and synthetic surfactants and natural drying oils such as glycerol triesters of fatty acids, including but not limited to soybean, rapeseed, linseed oils. Exemplary materials are citric acid and soybean oil.

In an embodiment, the at least one solvent is a polar or non-polar aprotic solvent.

In an embodiment, the at least one solvent is selected from the group consisting of benzene, hexane, ethers, toluene, xylene, pseudo cumene, cumene, naphthalenes, turpenes, plant oil extracts, waxes, paraffins, ethers, esters, methanol, ethanol, or propanol.

In an embodiment, the at least one solvent is a plant oil extract selected from the group consisting of citral, eucalyptus oils, orange fruit oils, seed oils, olive oil, citrus oils, tea tree oil, or pine oils. In examples, the plant oil extract is tea tree oils or eucalyptus oils. Other examples include eucalyptol or cineol, Australia tea tree oils, eucalyptus (lemon) species, essential oil extracts.

In an embodiment, the at least one surfactant is selected from the group consisting of Anionic, Cationic, Zwitterionic, Non-ionic, $C_{10}$-$C_{20}$ alcohol ethoxylates, fatty acid esters, amine oxides, sulfoxides, phosphine oxides, soybean oil, natural, or plant derived surfactants.

In an embodiment, the at least one surfactant is C10-16 pareth-1 or sodium laureth sulfate.

In an embodiment, the at least one chemical dye and the catalytic reagent are each dry and intermixed. As an example, a limiting mass of dry chemical dye can be adsorbed to excess mass of dry catalytic reagent, thus diluting the dry chemical dye in solid form.

In an embodiment, a ratio of dry chemical dye to catalytic reagent can be within the range from about 1 part colorimetric reagent to about 500 parts catalytic regent by weight (e.g., about 1 g dry chemical dye to about 500 g dry catalytic reagent. The process of mixing the two dry powders can be achieved by placing the correct mass of each dry powder into a ball mill and gently agitating until a homogenized dry mix is achieved (e.g. a consistent light grey-blue coloration).

In embodiments, the kits and methods described herein provide for dissolving a limiting mass of dry dye reagent in an excess volume of solvent and catalytic reagent, thus diluting the dry dye reagent in a solution ready for manufacture into said device. In examples, the dry diluted dye may be prepared as 0.6 g dry dye to 3.75 g dry catalytic reagent and 6 g of a liquid catalytic reagent and 200 g of a diluting solvent. The process of mixing the four components (dry dye:dry catalytic reagent:liquid catalytic reagent:diluting solvent) can be achieved by placing the correct mass of each component into a glass beaker and gently stirring until dissolution is complete achieving an homogenized greenish yellow solution.

In an embodiment, the mixture of dry chemical dye and dry catalytic reagent can be packaged in a paper, synthetic form fill seal sachet, breakable ampoule, blister pack, pressurized pump spray, a vial, a bottle, or a tube. Beneficially, such packaging provides storage, downstream packaging, shipping and ultimately powder to be released onto suspect residues during later use.

In an embodiment, the at least one solvent and the at least one surfactant can be are mixed in a ratio of about 1.5 L solvent to about 20 g surfactant. Alternatively, the ratio can be 99 parts solvent:1 part surfactant. Mixing can be achieved by combining the correct volumes of each of the solvent and surfactant into any suitable mixing vessel and homogenizing the solution by impeller mixing, to produce a solvent-surfactant solution.

In an embodiment, the mixture of the at least one dry chemical dye and the dry catalytic reagent is affixed to the surface of a solid support carrier. An exemplary material is 300 gsm white paper card A method for fabricating a portable detection kit for identifying the presence of narcotic compounds (NC) is provided. The method includes preparing a dry mixture including a dry chemical dye and a dry catalytic reagent. The method further includes storing the dry mixture. The method additionally includes preparing a solution including at least one solvent and at least one surfactant. The method also includes storing the solvent-surfactant solution in a delivery device. The at least one dry chemical dye is configured to undergo physic-chemical interaction with at least one predetermined NC to produce a color visible change. The at least one predetermined NC is selected from the group consisting of fentanyl analogues (FAs) and narcotics containing nitrogen heterocyclic moiety.

In an embodiment, storing the dry mixture includes affixing the dry mixture to a surface of a solid support carrier.

In an embodiment, affixing the dry mixture to the surface of a solid support carrier includes printing the dry mixture on to a natural or synthetic fiber sheet.

In an embodiment, the dry mixture is printed by letterpress, rotary gravure, rotary screen printing, flat screen printing, tampography, wax printing, contact dosing, ultrasonic sputter, flexographic, spray or drop on demand printing.

In an embodiment, printing the dry mixture includes adding the dry mixture to an aqueous solution of a gelling agent to form homogenized solution or suspension having a predetermined viscosity suitable for printing. As an example, the gelling agent can include at least one of starch, cellulose, natural gums and resins, polyvinyl-pyrolidone, polyvinyl-alcohol or acrylates. Other examples include natural drying oils including glycerol triesters of fatty acids In an embodiment, a ratio of the gelling agent:dry mixture: aqueous is within the range from about 0.5 parts to about 2.0 parts gelling agent to about 1 part to about 2 parts dry mixture to about 50 parts to about 70 parts aqueous solvent by weight (e.g. 1 g:1 g:50 g) to achieve the desired viscosity of final dye-catalytic reagent solution or suspension to allow use in the chosen printing system.

In an embodiment, the method further includes drying the homogenized solution or suspension on the solid support carrier (e.g., air drying). After drying, the solid support carrier can be cut or formed into any desired end use format, packaged in hermetically sealed light, air and moisture proof packaging for ease in transport, handling and long term storage prior to use.

In other embodiments, the solvent-surfactant solution can be supplied for use in any format which allows small volumes (e.g. 0.1-0.5 mL) to be applied to a suspect residue.

In an embodiment, the delivery device is a cotton swab that absorbs the solvent-surfactant mixture, a pop or snap swab that stores the solvent-surfactant mixture in a shaft, a wipe that absorbs the solvent-surfactant mixture, a syringe, a spray can, a pump spray bottle, a breakable ampoule, a blister pack, or a dropper bottle.

In an embodiment, delivery device is the cotton swab that absorbs the solvent-surfactant mixture, thus producing a pre-wetted solvent-surfactant swab. The pre-wetted solvent-surfactant swab can be packaged in a suitable format for safe storage, shipping and later use (e.g., form fill sealed in hermetically sealed light, air and moisture proof packaging). In an embodiment, the at least one chemical dye is configured to undergo physic-chemical interaction with the at least one predetermined NC in the form of liquids, gels or solid powders that are pure or admixed with cutting agents.

In an embodiment, the at least one chemical dye is a Phthalein dye.

In an embodiment, the Phthalein dye is selected from the group consisting of tetrabromophenolphthalein ethyl ester (TBPPEE)/or its salts.

In an embodiment, the at least one chemical dye is a diazonium dye.

In an embodiment, the diazonium dye is 4-bromobenzene diazonium tetrafluoroborate or 4-nitrobenzene diazonium tetrafluoroborate.

In an embodiment, the catalytic reagent increases the rate of appearance of the visible color change resulting from interaction between the at least one chemical dye reagent and the at least one predetermined NC.

In an embodiment, the catalytic reagent is selected from the group consisting of sodium bicarbonate, sodium tetraborate, calcium carbonate, sodium hydroxide, citric acid, salts of organic acids, ionic and non-ionic natural, and synthetic surfactants.

In an embodiment, the at least one solvent is a polar or non-polar aprotic solvent.

In an embodiment, the at least one solvent is selected from the group consisting of benzene, hexane, ethers, toluene, xylene, pseudo cumene, cumene, naphthalenes, turpenes, plant oil extracts, waxes, paraffins, ethers, esters, methanol, ethanol, or propanol.

In an embodiment, the at least one solvent is a plant oil extract selected from the group consisting of citral, eucalyptus oils, orange fruit oils, seed oils, olive oil, citrus oils, tea tree oil, or pine oils.

In an embodiment, the plant oil extract is a eucalyptus oil.

In an embodiment, the at least one surfactant is selected from the group consisting of Anionic, Cationic, Zwitterionic, Non-ionic, $C_{10}$-$C_{20}$ alcohol ethoxylates, fatty acid esters, amine oxides, sulfoxides, phosphine oxides, soybean oil, or plant derived surfactants.

In an embodiment, the at least one surfactant is C10-16 pareth-1 or sodium lauryl sulfate.

In an embodiment, a ratio of dry chemical dye to dry catalytic reagent within the dry mixture is within the range from about 1 part colorimetric reagent to about 500 parts catalytic regent by weight In an embodiment, a ratio of the at least one solvent to the at least one surfactant within the solvent-surfactant mixture is within the range from about 1.5 L solvent to about 20 g surfactant (e.g., 99 parts solvent:1 part surfactant.

In embodiments, the methods described herein provide methods of using the above-discussed kit for identifying the presence of NCs within a suspect residue When the kit includes the dry mixture of the chemical dye and catalytic reagent in a flowable form (e.g., not affixed to a carrier), the dry mixture is removed from its shipping packaging and applied (e.g., poured or sprinkled) upon the surface of the suspect residue. The ratio of suspect residue to dry mixture can be in the range from about 1 micrograms to about 2 micrograms suspect residue: about 50 milligrams to about 100 milligrams dry mixture. In certain embodiments, the total mass of both parts can be less than or equal to approximately 0.3 grams. Beneficially, this configuration avoids the need for an operator to touch the suspect residue.

The pre-wetted solvent-surfactant swab can be subsequently removed from shipping packaging and the operator holds the cotton swab shaft and applies the cotton swab to the suspect residue/dry diluted dye gently dabbing and swirling for approximately 10 seconds.

Subsequently, the operator can view both the cotton swab tip and the suspect residue/dry diluted dye for the following indications: (A) Positive presumptive colorimetric indication for the presence of FA's is rapid formation of obvious purple-pink-red color formation, (B) Negative result—deep blue, faint green and yellow.

Alternatively, in embodiments where the dry mixture is affixed to the carrier, the operator may remove the carrier from its packaging and transfer the sampled swabs to the surface of the carrier to contact the dry mixture, dabbing/rubbing sampled cotton swab into the dry mixture on the carrier, ensuring all components are mixed together, for approximately 10 seconds.

The methods herein further provide that the operator views both the swab tip and reaction mix on the carrier for the following indications: (A) Positive presumptive colorimetric indication for the presence of FA's is rapid formation of obvious purple-pink-red color formation, (B) Negative result—deep blue, faint green and yellow.

In alternative embodiments, the kit can contain the one or more solvent, the one or more surfactant, and the chemical dye pre-mixed together in any ratio which promotes the presumptive colorimetric indication of the one or more predetermined NCs. An exemplary ratio is 95 grams:4.5 grams:0.5 grams (solvent: surfactant: chemical dye). Mixing can be achieved by combining the correct mass of each of component into any suitable mixing vessel and homogenizing the solution by impeller mixing, to produce a solvent-surfactant-dye solution.

For example, the solvent-surfactant-dye solution can be supplied for use in any format which allows small volumes (e.g. 0.1-0.5 mL) to be applied to a suspect residue. Examples include, but are not limited to, adsorbed into a cotton swab, in the shaft of pop and snap swabs, wipes, syringes, spray cans, pump spray bottles, breakable ampoules, blister packs, dropper bottles. Additionally, an exemplary supply format is the cotton swab dipped into the solvent-surfactant-dye solution, thus producing a pre-wetted solvent-surfactant-dye swab. In embodiments, the pre-wetted solvent-surfactant-dye swab would can be packaged in a suitable format for safe storage, shipping and later use, for example form-fill and sealed in hermetically sealed light, air and moisture proof packaging.

In embodiments, the method of preparing a portable detection kit provides an exemplary packaging format and is form fill seal in 12 micron thick, aluminum for example, 7 micron thick, Poly Ethylene for example 50 micron thick.

BRIEF DESCRIPTION OF THE DRAWINGS

Other objectives of this invention will appear in the description and claims, with reference being made to the accompanying drawings, which form part of the specification.

DETAILED DESCRIPTION

Figure 1:
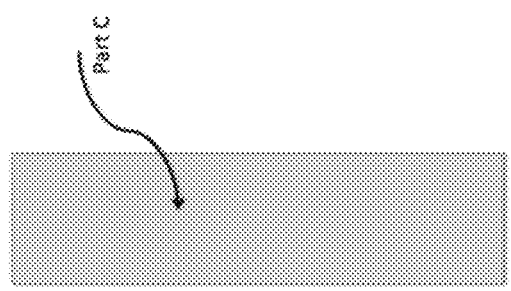
FIG. 1 illustrates a diagnostic test paper strips made in accordance with embodiments of the disclosure; (A) is plain white 300 gsm paper card, (B) Printed powder dye and catalytic reagent.

The present disclosure provides for improved methods of Fentanyl analogue detection. Contrary to current approaches for the presumptive identification of FA's, the current invention has discovered, for the first time, that selected solvents, surfactants, dry reactive dyes and catalytic reagents can be successfully mixed and packaged in various combinations to provide a highly selective, cheap, mass producible, portable detection device for the presumptive identification of FA's, and provide operator safety when using the device.

Current Detection Methods

Immunoassay style kits offer sensitive identification of some FA's, however struggle to detect a broad range FA's. Many independent laboratory trials and end user statements have also shown these devices to produce extremely high percentage false results, for example supermarket citric acid and many drugs of abuse will prevent many of the Immunoassay style kits from working at all. These immunoassay kits are designed for testing a limited number of FA's found in bodily fluids and not the modified method claimed by the manufacturers, which is to take a sample of the suspect FA's residue, dissolve in small volume of water, dip strip into said solution and wait up-to 10 minutes for a result.

Additionally, presumptive colorimetric based tests are available, however this relatively new range of FA's test kits use the same chemical reagents available for detection of established street drug groups, including but not limited to, opioids, amphetamines, Alkaloids, Cannabinoids, Cathinones, and the like, and thus cross reactivity and false result are very high. The NIK Fentanyl Testing Kit (NIK-6060 F) consists of 6 separate tests, which must be performed in order to facilitate a presumptive identification. Each NIK component consists of ampoules and reinforced baggies, containing hazardous solvents, chemical reagents and corrosive acids and bases. The same chemical reagents are also provided in the Fen-Her™ kit, marketed by Field Forensics.

Due to the extreme lipophilic character (i.e. fat soluble) of FA's, exposure to and contact with FA's must be reduced and or removed during normal operator use and detection procedures. Instances of penetration and absorption of FA's through eyes, nose, throat and skin have been reported [1]. The field deployable kits highlighted above, use methodology which does not decrease operator exposure to FA particulate.

The field deployable kits highlighted above also suffer from a variety of manufacture and end use problems, including but not limited to:

(i) kit construction requires liquid dropper bottles, breakable glass or plastic ampoules, blister packs and pressurized aerosol spray cans filled with hazardous liquid reagents, (ii) the presence of hazardous liquid reagents poses problems with manufacturing and exposure limitations, storage and handling, strict packaging requirements and significant shipping restrictions (iii) the volume or quantity of liquid reagent consumed during one single test is excessive and wasteful adding to costly, bulky and often overly complicated device construction design and packaging, (iv) during use, operators may be exposed to sharps and hazardous liquid reagent splash or overspray, (v) most existing devices require multi step operations in order to complete a single test, and (vi) existing kits and devices do not achieve the bench mark of true low cost mass manufacturing, which would be considered in the range of tens of millions of individual units per annum, with a commercial shelf life span of 3 to 5 years, (vii) most existing kits have been documented exploding due to the presence of cutting and/or diluting agents reacting with the hazardous acids or alkali reagents producing gasses, the kit construction does not allow for this excessive gas formation to dissipate, producing a kit which contains the gas and expands to the point of explosion covering operator with hazardous chemicals and potentially lethal FA's, (viii) most existing kits require the operator to scoop potential lethal FA's powders into small baggies for analysis, greatly increasing the risk of operator exposure, (ix) most existing kits do not test suspect liquids.

Without limitation, the kit described herein overcomes these highlighted limitations and achieves the necessary benchmarks.

Many methods for the identification of FA's currently exist, including but not limited to technical theory embodied in patent and scientific literature, laboratory procedures requiring highly sophisticated electronic equipment, and classical laboratory procedures all of which have limited or no field application, by way of example some of these are described below.

Fentanyl Analogues (FAs)

FA's have been isolated and identified both in research and forensic laboratories since the 1960's using both classical and modern methodologies including but not limited to HPLC[2][4], Colorimetric chemistry[3][11][13], Chromatography[5][6][7][9][14], ion-pairing[5][6][7][8], ELISA[7][10][20], GC-MS[10][14], LC-MS/MS[10][14], LC-HRMS[10], general electronic instrumentation[12][18][19][20].

A range of commonly used presumptive color change test reagents have been reported in literature, claiming to identify Fentanyl, including: Marquis (turning orange), Forrest's (turning yellow), Cobalt thiocyanate (turning blue), Cobalt nitrate (turning pink) and Mandelin (turns orange), Beam, Chen-Kao, Cobalt nitrate/ammonia, Ferric chloride, FPN, Frohde, Liebermann, PDA, Potassium, Vitali-Morrine and Zwikker and Eosin Y reagents[11][13]. The colors produced by these common tests are standard colors each test produces in response to hundreds of pre-cursors to and drugs of abuse.

Fentanyl analogues are readily known and may include both compounds developed by pharmaceutical companies for legitimate medical use, and those which have been sold as designer drugs and reported to national drug control agencies such as the Drug Enforcement Agency (DEA), or transnational agencies. More than 1400 compounds (fentanyl analogues) have been described in the scientific and patent literature. Provided below is a table comprising notable fentanyl analogues that have reached late-stage human clinical trials, or which have been identified as having been sold as designer drugs.

TABLE 1

Fentanyl analogues

| Chemical structure | Common name | Chemical name | CAS number |
|---|---|---|---|
| (structure) | 2,5-Dimethylfentanyl | N-[2,5-Dimethyl-1-(2-phenylethyl)piperidin-4-yl]-N-phenylpropanamide | 42045-97-6 |
| (structure) | 2,2'-Difluorofentanyl | N-(2-Fluorophenyl)-N-[1-(2-[2-fluorophenyl]ethyl)-4-piperidinyl]-propanamide | N/A |

TABLE 1-continued

Fentanyl analogues

| Chemical structure | Common name | Chemical name | CAS number |
|---|---|---|---|
| | 3-Allylfentanyl | N-[(3S,4R)-1-Phenethyl-3-prop-2-enylpiperidin-4-yl]-N-phenylpropanamide | 82208-84-2 |
| | 3-Fluorofentanyl (NFEPP) | N-(3-Fluoro-1-phenethyl-piperidin-4-yl)-N-phenyl-propionamide | 1422952-84-8 |

TABLE 1-continued

Fentanyl analogues

| Chemical structure | Common name | Chemical name | CAS number |
|---|---|---|---|
| | 3-Furanylfentanyl (3FUF) | N-Phenyl-N-[1-(2-phenylethyl) piperidin-4-yl]furan-3-carboxamide | 101343-82-2 |
| | 3-Methylbutyrfentanyl | N-[3-Methyl-1-(2-phenylethyl) piperidin-4-yl]-N-phenyl-butanamide | 97605-09-9 |
| | 3-Methylfentanyl (3-MF) | N-(3-methyl-1-phenethyl-4-piperidyl)-N-phenyl-propanamide | 42045-86-3 |

TABLE 1-continued
Fentanyl analogues
| Chemical structure | Common name | Chemical name | CAS number |
|---|---|---|---|
| 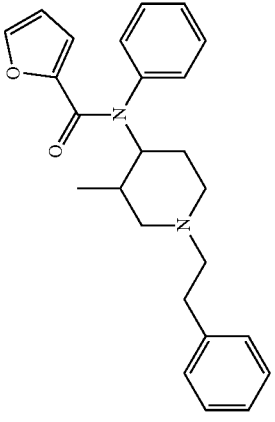 | 3-Methylfuranylfentanyl (3MFUF, TMFUF) | N-Pheny-N-[3-methyl-1-(2-phenylethyl)piperidin-4-yl]furan-2-carboxamide | N/A |
| 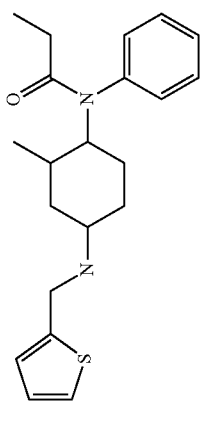 | 3-Methylthiofentanyl | N-{3-Methyl-1-[2-(2-thienyl)ethyl]piperidin-4-yl}-N-phenylpropanamide | 86052-04-2 |
| 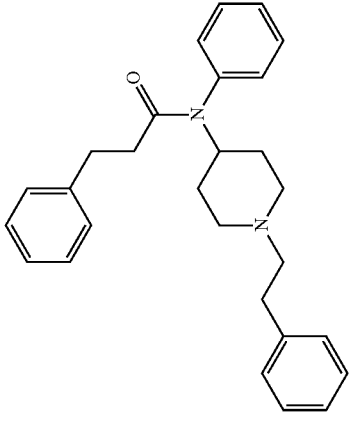 | 3-Phenylpropanoyl-fentanyl | N-Phenyl-N-[1-(2-phenylethyl)piperidin-4-yl]-3-phenyl-propanamide | 79279-02-0 |

TABLE 1-continued

Fentanyl analogues

| Chemical structure | Common name | Chemical name | CAS number |
|---|---|---|---|
| | 4-Fluorobutyrfentanyl (4-FBF) | N-(4-Fluorophenyl)-N-[1-(2-phenylethyl)-4-piperidinyl]-butanamide | 244195-31-1 |
| | 4-Chloroisobutyryl-fentanyl (4-CIBF) | 2-Methyl-N-(4-chlorophenyl)-N-[1-(1-phenylpropan-2-yl)piperidin-4-yl]propanamide | 244195-34-4 |
| | 4-Fluoroisobutyrfentanyl (4-FIBF) | N-(4-Fluorophenyl)-N-[1-(2-phenylethyl)-4-piperidinyl]-isobutanamide | 244195-32-2 |

TABLE 1-continued

Fentanyl analogues

| Chemical structure | Common name | Chemical name | CAS number |
|---|---|---|---|
|  | 4-Fluorofentanyl | N-(4-fluorophenyl)-N-[1-(2-phenylethyl) piperidin-4-yl]propanamide | 90736-23-5 |
|  | para-fluorofuranyl-fentanyl (p-F-Fu-F) | N-(1-phenethylpiperidin-4-yl)-N-(4-fluorophenyl)furan-2-carboxamide | 1802489-71-9 |
|  | para-chlorofuranyl-fentanyl (p-Cl-Fu-F) | N-(1-phenethylpiperidin-4-yl)-N-(4-chlorophenyl)furan-2-carboxamide | N/A |

TABLE 1-continued

Fentanyl analogues

| Chemical structure | Common name | Chemical name | CAS number |
|---|---|---|---|
|  | ortho-methylfuranyl-fentanyl (o-Me-Fu-F) | N-(1-phenethylpiperidin-4-yl)-N-(o-tolyl)furan-2-carboxamide | N/A |
|  | ortho-methoxyfuranyl-fentanyl (o-MeO-Fu-F) | N-(1-phenethylpiperidin-4-yl)-N-(2-methoxyphenyl)furan-2-carboxamide | N/A |
|  | ortho-isopropylfuranyl-fentanyl (o-iPr-Fu-F) | N-(1-phenethylpiperidin-4-yl)-N-(2-isopropylphenyl)furan-2-carboxamide | N/A |

TABLE 1-continued

Fentanyl analogues

| Common name | Chemical name | CAS number |
|---|---|---|
| 4-Phenylfentanyl | N-Phenyl-N-[4-phenyl-1-(2-phenylethyl)piperidin-4-yl]propanamide | 120448-97-7 |
| 4-Methoxybutyrfentanyl | N-(4-Methoxyphenyl)-N-[1-(2-phenylethyl)-4-piperidinyl]-butanamide | 2088842-68-4 |
| 4-Methylphenethylacetyl-fentanyl | N-[1-[2-(4-Methylphenyl)ethyl]-4-piperidinyl]-N-phenylacetamide | 1071703-95-1 |

TABLE 1-continued

Fentanyl analogues

| Chemical structure | Common name | Chemical name | CAS number |
|---|---|---|---|
| | Acrylfentanyl | N-Phenyl-N-[1-(2-phenylethyl)piperidin-4-yl]prop-2-enamide | 82003-75-6 |
| | α-Methylacetylfentanyl | N-Phenyl-N-[1-(1-phenylpropan-2-yl)-4-piperidyl]acetamide | 101860-00-8 |
| | α-Methylbutyrfentanyl | N-phenyl-N-[1-(1-phenylpropan-2-yl)-4-piperidyl]butanamide | N/A |
| | α-Methylfentanyl (AMF) | N-phenyl-N-[1-(1-phenylpropan-2-yl)-4-piperidyl]propanamide | 79704-88-4 |

TABLE 1-continued

Fentanyl analogues

| Chemical structure | Common name | Chemical name | CAS number |
|---|---|---|---|
| | α-Methylthiofentanyl | N-Pheny-N-[1-(1-thiophen-2-yl)propan-2-yl)-4-piperidyl]propanamide | 103963-66-2 |
| | α-Methyl-β-hydroxyfentanyl | N-[1-(1-hydroxy-1-phenylpropan-2-yl)piperidin-4-yl]-N-phenylpropanamide | N/A |
| | Acetylfentanyl | N-(1-Phenethylpiperidin-4-yl)-N-phenylacetamide | 3258-84-2 |
| | Alfentanyl | N-{1-[2-(4-ethyl-5-oxo-4,5-dihydro-1H-1,2,3,4-tetrazol-1-yl)ethyl]-4-(methoxymethyl)piperidin-4-yl]-N-phenylpropanamide | 71195-58-9 |

TABLE 1-continued

Fentanyl analogues

| Chemical structure | Common name | Chemical name | CAS number |
|---|---|---|---|
|  | Benzodioxolefentanyl | N-Phenyl-N-[1-(2-phenylethyl)piperidin-4-yl]-2H-1,3-benzodioxole-5-carboxamide | N/A |
|  | Benzoylfentanyl | N-(1-Phenethylpiperidin-4-yl)-N-phenylbenzamide | N/A |
|  | Benzylfentanyl | N-(1-Benzylpiperidin-4-yl)-N-phenylpropanamide | 1474-02-8 |

TABLE 1-continued

Fentanyl analogues

| Chemical structure | Common name | Chemical name | CAS number |
|---|---|---|---|
| (structure) | β-Hydroxyfentanyl | N-[1-(2-Hydroxy-2-phenylethyl)piperidin-4-yl]-N-phenylpropanamide | 78995-10-5 |
| (structure) | β-Hydroxythiofentanyl | N-{1-[2-Hydroxy-2-(thiophen-2-yl)ethyl]piperidin-4-yl]-N-phenylpropanamide | 1474-34-6 |
| (structure) | β-Hydroxy-4-methyl-fentanyl | N-[1-(2-hydroxy-2-phenylethyl)-4-methylpiperidin-4-yl]-N-phenylpropanamide | N/A |

TABLE 1-continued

Fentanyl analogues

| Chemical structure | Common name | Chemical name | CAS number |
|---|---|---|---|
|  | β-Methylfentanyl | N-Phenyl-N-[1-(2-phenylpropyl)piperidin-4-yl]propanamide | 79146-56-8 |
|  | Brorphine | 1-{1-[1-(4-bromophenyl)ethyl]piperidin-4-yl}-1,3-dihydro-2H-benzimidazol-2-one | N/A |
|  | Butyrfentanyl (Bu-F, BUF) | N-(1-(2-Phenylethyl)-4-piperidinyl)-N-phenylbutyramide | 1169-70-6 |

TABLE 1-continued

Fentanyl analogues

| Chemical structure | Common name | Chemical name | CAS number |
|---|---|---|---|
| | Brifentanyl | N-[(3R,4S)-1-[2-(4-Ethyl-5-oxotetrazol-1-yl)ethyl]-3-methylpiperidin-4-yl]-N-(2-fluorophenyl)-2-methoxyacetamide | 101345-71-5 |
| | Carfentanyl | Methyl 1-(2-phenylethyl)-4-[phenyl(propanoyl)amino]piperidine-4-carboxylate | 59708-52-0 |
| | Cyclopentylfentanyl | N-phenyl-N-[1-(2-phenylethyl)piperidin-4-yl]cyclopentanecarboxamide | 2088918-01-6 |

TABLE 1-continued

Fentanyl analogues

| Chemical structure | Common name | Chemical name | CAS number |
|---|---|---|---|
|  | Cyclopropylfentanyl | N-[1-(2-Phenylethyl)piperidin-4-yl]-N-phenylcyclopropane-carboxamide | 1169-68-2 |
|  | EAZ-91-05 | (quinuclidin-3-yl) 4-[phenyl(propanoyl)amino]-1-[2-(indol-3-yl)ethyl]piperidine-4-carboxylate | N/A |
|  | Isobutyrylfentanyl | 2-methyl-N-phenyl-N-[1-(1-phenylpropan-2-yl)piperidin-4-yl]propanamide | 119618-70-1 |

TABLE 1-continued

Fentanyl analogues

| Chemical structure | Common name | Chemical name | CAS number |
|---|---|---|---|
| | Isofentanyl | N-(1-Benzyl-3-methylpiperidin-4-yl)-N-phenylpropanamide | 79278-40-3 |
| | Homofentanyl (N-phenylpropylnorfentanyl) | N-phenyl-N-[1-(3-phenylpropyl)piperidin-4-yl]propanamide | N/A |
| | Hybrid molecule containing features of both fentanyl & haloperidol[1] | N-phenyl-N-{1-[4-(4-fluorophenyl)-4-oxobutyl]piperidin-4-yl}propanamide | N/A |
| | trans-phenylcyclopropyl-norfentanyl | 1-(trans-2-Phenylcyclopropyl)-4-(N-propionylanilino)piperidine | 102504-49-4 |

TABLE 1-continued

Fentanyl analogues

| Chemical structure | Common name | Chemical name | CAS number |
|---|---|---|---|
| | Pyridin-4-ylethyl-nor-fentanyl | N-phenyl-N-[1-(2-pyridin-4-ylethyl)piperidin-4-yl]propanamide | 1443-41-0 |
| | Furanylfentanyl (Fu-F, FUF) | N-Phenyl-N-[1-(2-phenylethyl)piperidin-4-yl]furan-2-carboxamide | 101345-66-8 |
| | Furanylethylfentanyl (FUEF) | N-[1-[2-(2-furanyl)ethyl]-4-piperidinyl]-N-phenyl-propanamide | 802544-02-1 |

TABLE 1-continued

Fentanyl analogues

| Chemical structure | Common name | Chemical name | CAS number |
|---|---|---|---|
| | Fentanyl 4-methylene analogue (WO 2007/093603) | N-phenyl-N-{[1-(2-phenylethyl)piperidin-4-yl]methyl]propanamide | N/A |
| | Lofentanyl | methyl (3S,4R)-3-methyl-1-(2-phenylethyl)-4-[phenyl(propionyl)amino]piperidine-4-carboxylate | 61380-40-3 |
| | N-Methylnorcarfentanyl | methyl 1-methyl-4-(N-phenyl-propanamido)piperidine-4-carboxylate | 59708-50-8 |

TABLE 1-continued

Fentanyl analogues

| Chemical structure | Common name | Chemical name | CAS number |
|---|---|---|---|
|  | Methoxyacetylfentanyl (MAF) | 2-Methoxy-N-(1-phenethylpiperidin-4-yl)-N-phenylacetamide | 101345-67-9 |
|  | meta-fluorofentanyl | N-(3-Fluorophenyl)-N-[1-(2-phenylethyl)-4-piperidinyl]-propanamide | 90736-22-4 |
|  | Mirfentanyl | N-[1-(2-Phenylethyl)piperidin-4-yl]-N-pyrazin-2-yl-2-furamide | 117523-47-4 |

TABLE 1-continued
Fentanyl analogues
| Chemical structure | Common name | Chemical name | CAS number |
|---|---|---|---|
| 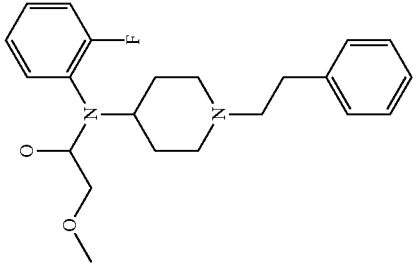 | Ocfentanyl | N-(2-Fluorophenyl)-2-methoxy-N-[1-(2-phenylethyl)piperidin-4-yl]acetamide | 101343-69-5 |
| 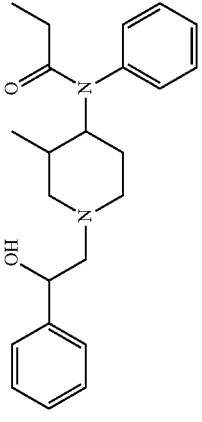 | Ohmefentanyl | N-[1-(2-hydroxy-2-phenylethyl)-3-methylpiperidin-4-yl]-N-phenylpropanamide | 78995-14-9 |
| 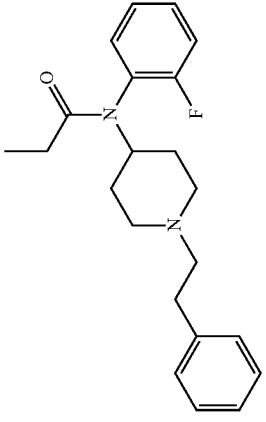 | Orthofluorofentanyl | N-(2-Fluorophenyl)-N-[1-(2-phenylethyl)-4-piperidinyl]-propanamide | N/A |

TABLE 1-continued
Fentanyl analogues
| Chemical structure | Common name | Chemical name | CAS number |
|---|---|---|---|
| 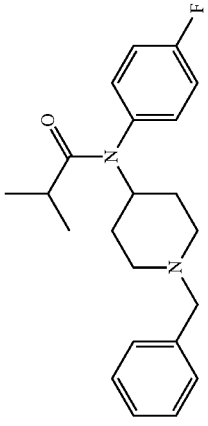 | Parafluoroisobutyryl-benzylfentanyl | N-[(1-benzylpiperidin-4-yl)methyl]-N-(4-fluorophenyl)-2-methylpropanamide | N/A |
| 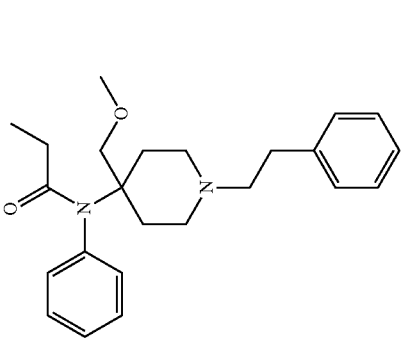 | R-30490 | N-[4-(Methoxymethyl)-1-(2-phenylethyl)piperidin-4-yl]-N-phenylpropanamide | 60618-49-7 |
| 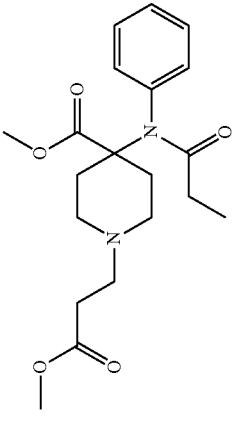 | Remifentanyl | methyl 1-(3-methoxy-3-oxo-propyl)-4-(N-phenylpropanamido)piperidine-4-carboxylate | 132875-61-7 |

TABLE 1-continued

Fentanyl analogues

| Chemical structure | Common name | Chemical name | CAS number |
|---|---|---|---|
|  | Secofentanyl | N-phenyl-N-(4-[methyl(2-phenylethyl)amino]butan-2-yl]propanamide | N/A |
|  | Sufentanil | N-[4-(Methoxymethyl)-1-(2-thiofuran-2-ylethyl)-4-piperidyl]-N-phenylpropanamide | 56030-54-7 |
|  | Tetrahydrofuranyl-fentanyl | N-Phenyl-N-[1-(2-phenylethyl)piperidin-4-yl]oxolane-2-carboxamide | 2142571-01-3 |

TABLE 1-continued

Fentanyl analogues

| Chemical structure | Common name | Chemical name | CAS number |
|---|---|---|---|
| 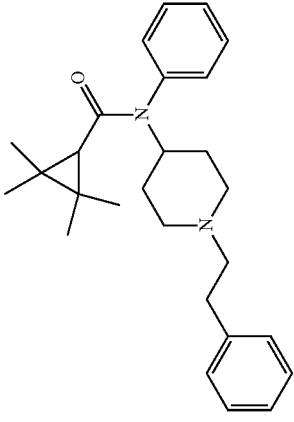 | Tetramethylcyclopropyl-fentanyl | 2,2,3,3-Tetramethyl-N-(1-phenethylpiperidin-4-yl)-N-phenylcyclopropane-1-carboxamide | 2309383-11-5 |
| 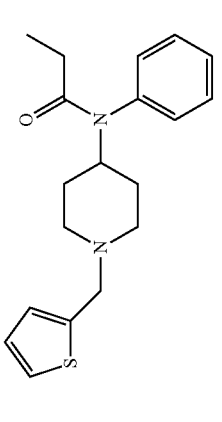 | Thenylfentanyl | N-phenyl-N-{[1-(thiophen-2-ylmethyl)piperidin-4-yl]methyl}propanamide | 117332-93-1 |
| 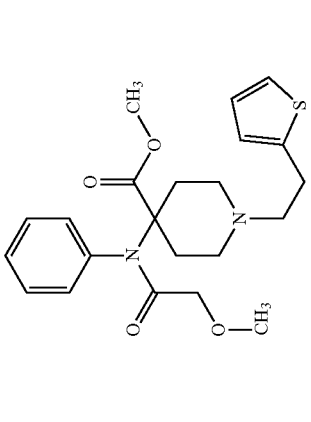 | Thiafentanil | methyl 4-(N-(2-methoxyacetyl)anilino)-1-(2-thiophen-2-ylethyl)piperidine-4-carboxylate | 101345-60-2 |

TABLE 1-continued

Fentanyl analogues

| Chemical structure | Common name | Chemical name | CAS number |
|---|---|---|---|
| | Thiofentanyl | N-phenyl-N-{1-[2-(2-thienyl)ethyl]piperidin-4-yl}propanamide | 1165-22-6 |
| | Trefentanyl | N-{1-[2-(4-ethyl-5-oxo-4,5-dihydro-1H-tetrazol-1-yl)ethyl]-4-phenylpiperidin-4-yl}-N-(2-fluorophenyl)propanamide | 120656-93-1 |
| | Trifluorofentanyl | See, e.g., U.S. Patent 20,110,046,180 | N/A |

TABLE 1-continued
Fentanyl analogues
| Chemical structure | Common name | Chemical name | CAS number |
|---|---|---|---|
| 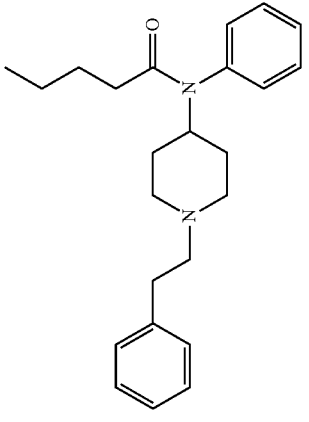 | Valerylfentanyl (VF) | N-(1-(2-Phenylethyl)-4-piperidinyl)-N-phenylpentylamide | 122882-90-0 |

Current Techniques and Shortcomings

A number of applications (CN104111283A, CN1031134847A, CN100402084C, US20170198363A1, EP1312923A2, US20060040406A1), describe methods for fentanyl detection consisting of Enzyme-linked immunosorbent assays (ELISAs), Radioimmunoassay, Ion Mobility spectrometry and Fluorescence detection of FAs in blood and urine samples. The disclosures are only suitable for use in a laboratory setting, is not applicable to suspect residue analysis or field deployment and is un-suited to a simple kit format and manufacture.

US20100197516A1 describes an electronic fluorescence probe for Fentanyl Citrate, using the organic dyes Congo red, Phenol Red, Eosin Y and 8-hydroxypyrene-1,3,6-trisulfonic acid trisodium salt. The fluorescent signature of Fentanyl Citrate however does not appear to be unique, with other drugs of abuse also producing similar fluorescence and no mention of other FA's is provided. The disclosure is only suitable for use in a laboratory setting, is not applicable to suspect residue analysis or field deployment and is un-suited to a simple kit format and manufacture.

Colorimetric chemistry techniques used for detection of drugs of abuse, excluding FA's, are well known. Ion pairing, however, is less well known. A non-patent, literature survey has identified the following ion pair dyes and solvent systems used for both FA's and drugs of abuse identification and for classical laboratory techniques including titration end point analysis: Dyes-Acid Orange 7, Acid Red 88, Crocein Orange G, Ethyl Orange Sodium Salt, Bromocresol Purple, Methyl Orange, TBPPEE. Existing ion-pairing systems utilize the following solvents exclusively-Dichloromethane, Chloroform, Carbon tetrachloride, cyclohexane, n-hexane, monochlorobenzene, toluene, butyl acetate, ether, ethylacetate, isoamyl alcohol, nitrobenzene, nitromethane, methyl isobutyl ketone[7][15][16][17][21][22][23][24][25][26][27]. All of these dyes described, excluding TBPPEE, do not produce typical color changes in the presence of narcotic compounds, instead the procedures described rely on the drug-dye ion-pair being more soluble in the organic solvent than the aqueous phase the narcotic was initially located in. The colored dye with drug attached is simply extracted into the organic solvent, without any color change of original dye color. This system (A) uses highly toxic, hazardous and volatile solvents which cannot be used in modern day packaging methodologies and are not field deployable, (B) does not differentiate between any narcotic species, (C) can only be performed in laboratory settings and in not field deployable.

US2008/0190354A1 discloses the use of Tetrabromo Phenol Phthalein Ethyl Ester (TBPPEE) for detecting presence of foreign matter i.e. basic organic species within petrochemical fuels systems. The process essentially incorporates a lipophilic organic dye (TBPPEE) and an organic solvent (i.e. fuel), mixed together in the presence of dissolved basic organic molecules (i.e. foreign matter) produces a discernible colorimetric indication. The disclosure requires the presence of volatile fuels, is not applicable to narcotics detection and is only suitable for use in a laboratory setting, is not applicable to suspect residue analysis or field deployment and is un-suited to a simple kit format and manufacture.

U.S. Pat. No. 4,272,380 discloses the use of lipophilic dyes capable of ion-pairing with narcotics in bodily fluid samples. Oil Red O, 1-[(4-[xylylazo] xylyl) azo]-2-naphthol, Sudan IV, Oil Red OB and Oil Blue are mentioned. The disclosure is only suitable to urine partitioned with highly toxic, hazardous and volatile chloroform. The methodology requires removal of the organic phase, pre-concentration and thin layer chromatography separation and subsequent visualisation via Rf positioning. The disclosure is only suitable for use in a laboratory setting, is not applicable to suspect residue analysis or field deployment and is un-suited to a simple kit format and manufacture.

U.S. Pat. No. 4,806,487 Also discloses use of ion-pairing dyes Fast Blue BB and TBPPEE to bind and precipitate the narcotic species in Urine sample. The disclosure, similar to gravimetric analysis, is only suited to laboratory bodily fluid analysis, requires subsequently filtration of the precipitated colored filter cake for mass analysis and color identification. This disclosure fails to provide any form of individual narcotic separation and identification. The disclosure is only suitable for use in a laboratory setting, is not applicable to suspect residue analysis or field deployment and is un-suited to a simple kit format and manufacture.

WO1998/045714/EP0983514 Also discloses the use of TBPPEE colorimetric detection, not specifically ion-pairing, of heroin street samples. The complete test involves (1) collection of 2 separate suspect residue samples onto two separate paper wipes. (2) the first collected paper wipe sample is added to water and placed into a test tube (3) drops of TBPPEE dissolved in a solvent including chloroform, dichloromethane, 1,2-dichloroethane are added to the test tube and color development noted. (4) drops of hexane are now added to the test tube and color development noted. (5) The second paper wipe sample is added to another test tube and to this is added the Marquis reagent and color development observed. (6) Comparison of all colors developed lead to a presumptive identification of the unknown. The kit and method described is cumbersome and would not be considered highly portable, mass producible or field deployable. The solvents used are highly toxic, hazardous and volatile, and have been banned for use in manufacturing industries globally. The disclosure is only suitable for use in a laboratory setting.

US2011/0117664A1 Discloses a method identifying narcotic species in unknown residue again by a combination of simple colorimetric indication in one step, coupled with comparison of ion-pair color formation in a second step. The method includes the steps (1) collect samples 2 samples of suspect residue from a surface in a paper wipe. (2) contacting the first sample with a dissolved diazonium salt and (3) bringing this mix into contact with a cobalt salt dissolved in water to provide partial color identification of narcotic species present. (4) The second sample is contacted with a partially water miscible organic solvent within which is dissolved an ion pairing pH color change reagent for partial color identification of narcotic species present. As in the above comparison of all color indications provides presumptive identification of the narcotic species present. Reagents are chosen from a list of Cobalt salts, Diazonium salts (Fast Corinth V or Fast Black K) and pH indicator are chosen from brominated organic compound selected from a group consisting of bromophenol red, bromocresol purple, tetrabromophenolblue, and tetra bromophenolphthalein ethyl ester. The solvents are chosen from water, ethyl acetate, butyl acetate, dipropylene glycol dimethylether, diethylether, dipropylether, methylene chloride, methyl ethyl ketone, acetone, dimethyl sulfoxide, N-methylpyrrolidone, ethanol, methanol, propanol, isopropanol, butanol, isobutanol, glycerol, propylene glycol. In its current form, the disclosure uses solvents which interfere with individual narcotic species imparting potential color differences. The listed solvents produce a consistent dark blue for most, if not all narcotics, food stuff and cutting agents. Most of the solvents used are highly toxic, hazardous and volatile, and have been banned for use in manufacturing industries globally. The disclosure is only suitable for use in a laboratory setting, is not applicable to suspect residue analysis or field deployment and is un-suited to a simple kit format and manufacture.

CN104111283A, CN1031134847A, CN100402084C, US20170198363A1, EP1312923A2, US20060040406A1 are immunoassay based systems mostly geared to laboratory analysis of FA's in bodily fluids. They fail to disclose FA detection in illicit solid or liquid matrices in field clandestine environments.

US20100197516A1 requires electronic fluorescence detection for identification of Fentanyl citrate. The probes used are highly cross reactive and likely to produce significant false reporting. It fails to identify the broader FA's of which there are currently 150 to 200 illicit or commercially available analogues.

US2008/0190354A1 is the first disclosure of utilising the ion-pairing lipophilic dye TBPPEE for identification of basic organic species. However this disclosure fails to mention narcotics and does not provide kit design.

U.S. Pat. Nos. 4,272,380, 4,806,487, WO1998/045714/ EP0983514, US2011/0117664A1 and Non-Patent Ref[5][6][7][8][15][16][17][18][19][20][21][22][23][24][25][26][27] describe the broader use of ion-pairing lipophilic dyes for narcotics identification however all fail to grasp and explain the concept as a whole including but not limited to the need for partition of broadly non-polar aprotic organic solvents within an aqueous environment.

As shown by embodiments of the present disclosure, it is the interphase of the organic/aqueous partition where color development occurs, which impacts greatly on kit design and visualisation of color development.

Need in the Art and Failure of Others

As described herein, the identified patents and reference literature fail to identify a wider range of organic liquids which full fill the requirement of non-polar and aprotic and all fail to identify that selection of the organic liquid, i.e. the solvent, greatly influences both the colors developed and by which narcotic group present, thus facilitating specific identification of individual narcotic groups in mixtures. Further to this point, selection of acidic or alkaline reagents into the ion-pairing aqueous/organic solvent matrix also offers manipulation of the colors developed and by which narcotic groups and so improves selective identification of narcotic groups. The above identified patents and reference literature fail to explore a far broader range of non-traditional non-polar, non-hazardous, non-toxic solvents which fulfil the requirements of ion-pair extraction, selectively promoting ion-pair formation for target narcotic molecules while inhibiting ion-pair formation of non-target narcotic molecules.

The current techniques fail to make the link between the ion-pair solution and physical solid support structures which allow for a combination of ion-pair extraction and chromatographic separation, the combination of which greatly enhances selective identification of target narcotic molecules.

The identified literature also fail to achieve a device which is low cost, mass producible, of a single step detection, capable of shelf life storage of multiple years. Most of the above patents disclosures and reference literature fail to identify FA's and all fail to minimise operator exposure to FA's during the course of executing their duty. Moreover, the above patents disclosures and reference literature are aligned with laboratory use, not intended for kit form and/or field deployment.

The preceding summary, of patent references and public domain literature and disclosures, does not intend to limit itself to these examples. They are provided only as a point of reference in the difference between laboratory equipment and procedures and true single step, cheap mass producible, field deployable presumptive colorimetric test kit for the detection of FAs and identification and differentiation between other specific narcotics including, but not limited to, heroin, amphetamines, cocaine, and nicotine, which limits exposure of operators to the hazards of FA's identification, as disclosed in the embodiments of the current disclosure.

Solid Support

Figure 2:
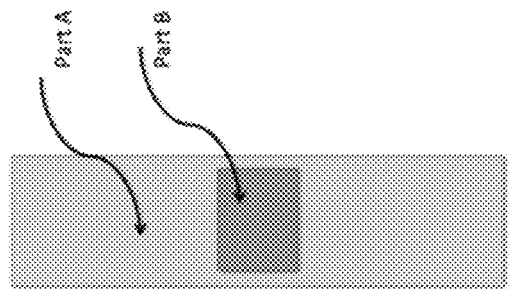
FIG. 2 illustrates a diagnostic test paper strips made in accordance with embodiments of the disclosure; (C) dip dried or commercial product (e.g. mineral paper) synthetic paper with dry catalytic reagents dry adsorbed within matrix.

Suitable solid support substrates to which the chemical dye and catalytic reagent affixed are illustrated in FIG. 1. In an embodiment, the solid support substrate (part A) can be 300 gsm card paper. The chemical dye and catalytic reagent can be affixed to the surface (part B) by a variety of techniques, such as printing. Alternatively, the dry chemical dye and catalytic reagent can be dip dried on a paper and absorbed within the solid support, such as mineral paper, as shown in FIG. 2 (part C).

Figure 3:
FIG. 3 illustrates a cotton swab made in accordance with embodiments of the disclosure; (D) Plastic polypropylene shaft handle. (E) Cotton swab head, pre-wetted with any combination of (i) Solvent, (ii) Surfactant, (iii) Dye and (iv) Catalytic reagent.

In accordance with embodiments of the present disclosure and without limitation, Absorbent Material In accordance with the current invention and without limitation, in one embodiment, the absorbent material is a pre-wetted cotton swab having a handle (part D) and a tip (part E), as shown in FIG. 3. The pre-wetting is achieved by simple dip and/or rapid immersion of the cotton matrix into large volume pre-mixed co-solvent vat or micro-jet spray or similar. Pre-wetting is a fully automated process utilizing conventional conveyor, hopper, spray machinery, which are known in the art.

Figure 4:
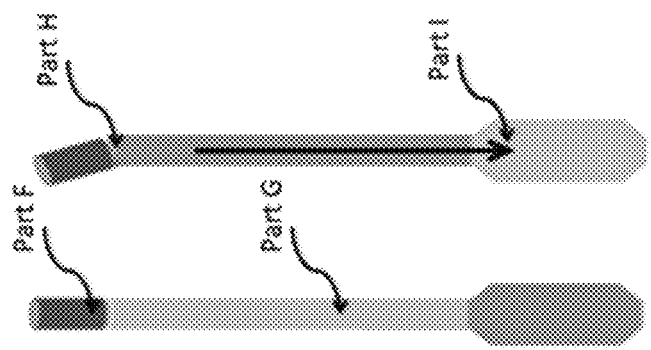
FIG. 4 illustrates a cotton tipped snap swab made in accordance with embodiments of the disclosure; (F) etched shaft tip which snaps when twisted releasing solvent contained in hollow shaft, into swab tip. (G) hollow plastic shaft filled with any combination of (i) Solvent, (ii) Surfactant, (iii) Dye and (iv) Catalytic reagent. (H) snapped handle. (I) pre-filled hollow shaft releases liquid formulation into swab tip.

In another embodiment and without limitation the absorbent material is a "snap cotton swab," as shown in FIG. 4. The hollow swab handle (part G) is pre-filled in fully automated commercial fill processes with any combination of (i) Solvent, (ii) Surfactant, (iii) Dye and (iv) Catalytic reagent, as described in preceding sections of this disclosure. The tip of the swab handle can have an etched groove (part F) applied during swab manufacture which is easily snapped (part H) between thumb and forefinger, releasing said shaft contents down and into the cotton tip (part I).

Figure 5:
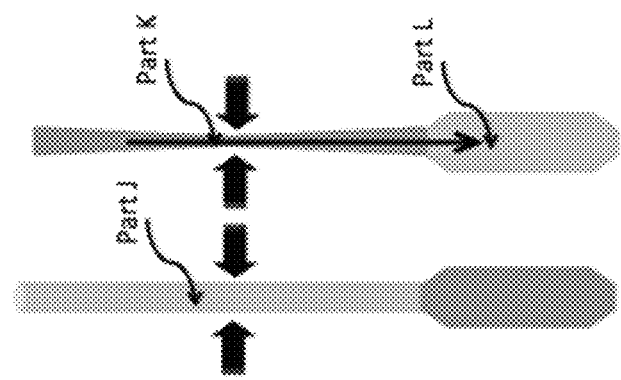
FIG. 5 illustrates a cotton tipped pop swab made in accordance with the disclosed embodiments; (J) flexible plastic hollow shaft pre-filled with any combination of (i) Solvent, (ii) Surfactant, (iii) Dye and (iv) Catalytic reagent. (K) squeezed and "popped" flexible shaft, releasing liquid formulation. (L) swab tip receiving liquid formulation.

In yet another embodiment and without limitation the absorbent material is a "pop cotton swab," as shown in FIG. 5. The hollow flexible swab handle (J) is pre-filled in fully automated commercial fill processes with any combination of (i) Solvent, (ii) Surfactant, (iii) Dye and (iv) Catalytic reagent, as described above. The handle of the swab handle (part J) is easily squeezed (part K) and small closure contained with hollow shaft handle is broken or "popped" between thumb and forefinger, releasing said shaft contents down and into the cotton tip (part L).

Figure 13:
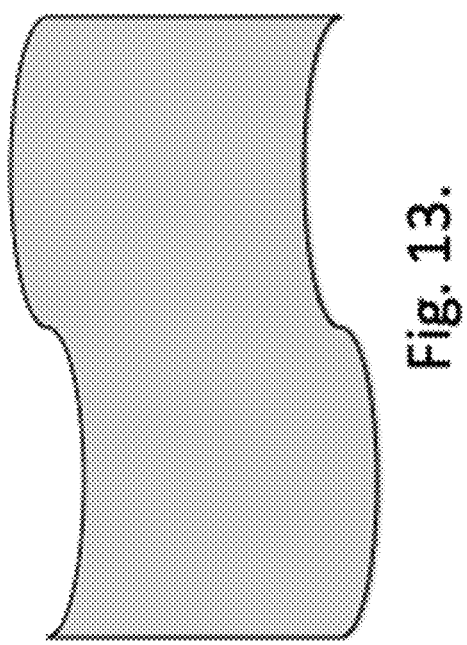
FIG. 13 illustrates a wipe made in accordance with embodiments of the disclosure, pre-wetted with any combination of (i) Solvent, (ii) Surfactant, (iii) Dye and (iv) Catalytic reagent.

In yet another embodiment, shown in FIG. 13, the absorbent material is a "wipe". The "wipe" is made of any natural or synthetic polymeric fibers and pre-wetted with any combination of (i) Solvent, (ii) Surfactant, (iii) Dye and (iv) Catalytic reagent, as described in preceding sections of this disclosure. The "wipe" is simply applied to the suspect residues and pressed into or wiped across said residue for collection and presumptive identification of said residues.

In accordance with the current invention and without limitation, a suitable way of providing the device is by pre-wetted single head cotton swab, which contains any combination and ratio of solvent(s), catalytic reagents, surfactant, and dye. In an embodiment, the solvent may be Eucalyptus citriodora Oil or Melaleuca alternifolia Oil.

Containers

Figure 9:
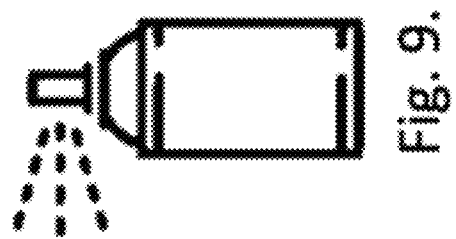
FIG. 9 illustrates a spray can made in accordance with embodiments of the disclosure, pre-filled with any combination of (i) Solvent, (ii) Surfactant, (iii) Dye and (iv) Catalytic reagent.
Figure 8:
FIG. 8 illustrates a pump spray bottle made in accordance with embodiments of the disclosure, pre-filled with any combination of (i) Solvent, (ii) Surfactant, (iii) Dye and (iv) Catalytic reagent.
Figure 7:
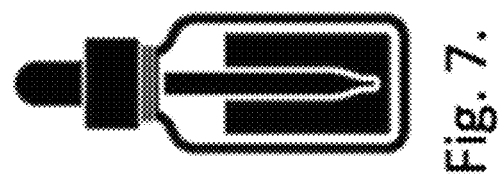
FIG. 7 illustrates a dropper bottle made in accordance with embodiments of the disclosure, pre-filled with any combination of (i) Solvent, (ii) Surfactant, (iii) Dye and (iv) Catalytic reagent.
Figure 6:
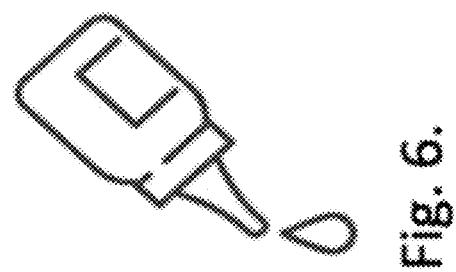
FIG. 6 illustrates a dropper bottle made in accordance with embodiments of the disclosure, pre-filled with any combination of (i) Solvent, (ii) Surfactant, (iii) Dye and (iv) Catalytic reagent.
Figure 11:
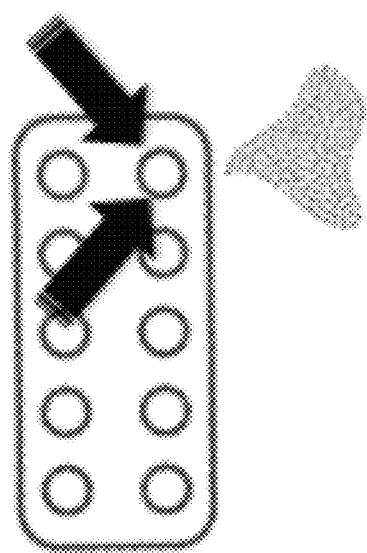
FIG. 11 illustrates a blister pack made in accordance with embodiments of the disclosure, pre-filled with any combination of (i) Dye and (ii) Catalytic reagent.
Figure 10:
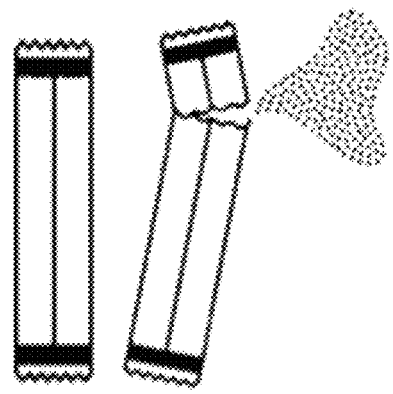
FIG. 10 illustrates a sachet made in accordance with embodiments of the disclosure, pre-filled with any combination of (i) Dye and (ii) Catalytic reagent.
Figure 12:
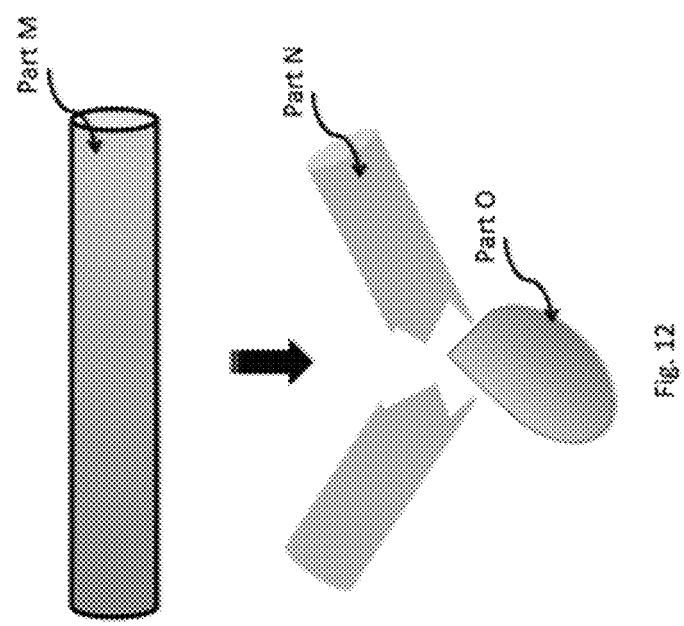
FIG. 12 illustrates a breakable ampoule made in accordance with embodiments of the disclosure, pre-filled with any combination of (i) Solvent, (ii) Surfactant, (iii) Dye and (iv) Catalytic reagent. (M) Plastic or glass or flexible polymer ampoule pre-filled with formulation. (N) Broken/snapped/squashed ampule. (O) Contained formulation released.

An Ampoule (FIG. 12), Blister pack (FIG. 11), Dropper bottle (FIGS. 6-7), pump spray bottle (FIG. 8), spray can (FIG. 9), or sachet (FIG. 10) may be used to contain any combination of (i) Solvent, (ii) Surfactant, (iii) Dye and (iv) Catalytic reagent, as described in preceding sections of this disclosure.

The above examples are effective methods to safely any formulation in any combination of (i) Solvent, (ii) Surfactant and/or gelling agents, (iii) Dye and (iv) Catalytic reagent, as described in preceding sections of this disclosure. Allowing mass production, packaging, shipping and transport and carriage by end user prior to use.

Presumptive Colorimetric Reagent

The presumptive colorimetric reagent produces a known visual color indication in the presence of FAs, thus identifying and differentiating this class of compounds within unknown suspect residues, be they solid or liquid. The colorimetric dye can also identify and differentiate between other drugs of abuse, including but not limited to, heroin, amphetamines, cocaine, and nicotine.

In accordance with the current invention and without limitation, in one embodiment, a suitable presumptive colorimetric dye for the presumptive identification of NCs is a Phthalein dye, such as tetrabromophenolphthaleine ethyl ester (TBPPEE) or its salts.

Printing Solution

In accordance with the current invention and without limitation, in one embodiment, a suitable printing solution may be provided by mixing and dissolving the dye, the catalytic reagent and the dissolving solvent together in any ratio to promote detection of NCs.

Exemplary ratios of chemical dye to catalytic reagent to solvent can range from about 6 g to about 9 g chemical dye: about 50 g to about 70 g catalytic reagent: about 2 L to about 2.5 L solvent. In an embodiment, the ratio is 1:5:200.

Printing Method

In accordance with the current invention and without limitation, in one embodiment, a suitable printing method may be provided in the form of letterpress, rotary gravure, rotary screen printing, flat screen printing, tampography, wax printing, contact dosing, ultrasonic sputter, flexographic, spray, or drop on demand printing.

Dissolving Solvent

In accordance with the current invention and without limitation, in one embodiment, a suitable dissolving solvent is one or more of benzene, hexane, ethers, toluene, xylene, pseudo cumene, cumene, naphthalenes, turpenes, plant oil extracts, waxes, paraffins, ethers, or esters, methanol, ethanol or propanol.

Pre-Wetted Swab Solvent

In accordance with the current invention and without limitation, in one embodiment, a suitable solvent is *Eucalyptus citriodora* Oil or *Melaleuca alternifolia* Oil or eucalyptol.

Surfactant

Embodiments of the at least one surfactant can include, but are not limited to, Anionic, Cationic, Zwitterionic, Non-ionic, $C_{10}$-$C_{20}$ alcohol ethoxylates, fatty acid esters, amine oxides, sulfoxides, phosphine oxides, soybean oil, natural or plant derived surfactants Catalytic Reagent In an embodiment, the catalytic reagent increases the rate of appearance of the visible color change resulting from interaction between the at least one chemical dye reagent and the at least one predetermined NC. The catalytic reagent can include, but is not limited to, sodium bicarbonate, sodium tetraborate, calcium carbonate, sodium hydroxide, salts of organic acids, citric acid, ionic and non-ionic natural, and synthetic surfactants.

Printing Solid Support

In accordance with the current invention and without limitation, in one embodiment, a suitable method of providing the solid support for printing the reagent solution is TECH 12 PT paper or synthetic polypropylene or polyethylene plastic paper. Guillotined to desired end user dimensions and then packaged in suitable form fill seal sachet (see below).

Pre-Wetting Absorbent Material

The dry absorbent material is immersed into the Essential Oil and then packaged in suitable form fill seal sachet, as discussed in greater detail below.

Packaging

In accordance with embodiments of the present disclosure, the kit, the pre-wetted sample collection swab can be packaged in moisture and UV resistant packages prior to use. Preferably the packaging would be a tare open, form, fill and seal sachet. The sachet can be constructed from commercially available Paper/PET12 µm/AL7 µm/PE50 product, which is an extremely cheap, mass produced material. The dry mineral paper strip, can be packaged individually in separate paper based sachets. All sachets are formed by vertical and/or horizontal form/seal machines, which are well known in the art.

Use of Kit

In accordance with embodiments of the present disclosure, the kit can be carried in a pocket, belt case, glove box, brief case, etc. and where a suspect residue is observed, both the pre-wetted swab and paper strip are removed from respective sachet packaging. The swab is rubbed into the suspect residue, liquid, gel, solid and/or across suitable surfaces for several seconds, to facilitate the collection of a representative sample of the suspect residue. At this stage a visual identification of NCscan be facilitated as the swab begins to turn from un-reacted blue color to reacted presumptive positive purple/pink/red. To complete the process, the sample swab is transferred to the paper strip and paper strip is folded around swab tip, and pressure applied to between thumb and fore finger or against a flat surface, squeezing solvents and reagents and suspects residue into paper strip, thus facilitating full mixing of all components and enhancing any presumptive colorimetric indication for NCs.

Color Indications

In accordance with the current invention and without limitation, example results from using the kit of the current invention are provided: (Control swab—Negative) no color change—Yello or Yellow to Green or Blue. (Positive Indication) Color Rapid change from Yello to Purple/Pink/Red.

| | |
|---|---|
| Acetaminophen | Negative |
| Amphetamine HCl | Negative |
| Aspirin | Negative |
| Baking Soda | Negative |
| Benzphetamine HCl | Not Available |
| Brompheniramine Maleate CH | Positive (Fentanyl structure) |
| Caffeine | Negative |
| Chlordiazepoxide HCl | Negative |
| Chlorpromazine HCl | Positive (Fentanyl structure) |
| Cocaine HCl | Negative |
| Codeine | Not available |
| Coffee Mate | Negative |

-continued

| | |
|---|---|
| Contac | Negative |
| Diacetylmorphine HCl (HEROIN) | Negative |
| Diazepam | Negative |
| Dimethoxy-meth HCl | Negative |
| Doxepin HCl | False Positive |
| Dristan | Negative |
| Ephedrine HCl | Negative |
| Exedrine | Negative |
| Hydrocodone tartrate | Negative |
| LSD | Negative |
| Mace | Not available |
| MDA HCl | False Positive |
| MDMA | Negative |
| Meperidine HCl | Positive (Fentanyl structure) |
| Mephedrone | False Positive |
| Mescaline HCl | Negative |
| Methadone HCl | Not available |
| Methamphetamine HCl | Negative |
| Methaqualone | Negative |
| Methylphenidate HCl | Positive (Fentanyl structure) |
| Morphine monohydrate | Negative |
| Nicotine | Negative |
| Nutmeg | Negative |
| Opium | Not Available |
| Oxycodone HCl | Negative |
| Pentobarbital | Negative |
| Phencyclidine HCl | Positive (Fentanyl structure) |
| Phenobarbital | Negative |
| Procaine HCl | Negative |
| Propoxyphene HCl | False Positive |
| Pseudoephedrine HCl | Negative |
| Quinine HCl | Positive (Fentanyl structure) |
| Salt | Negative |
| Secobarbital | Negative |
| Sugar | Negative |
| Stevia | Negative |
| Tea | Negative |
| THC | Negative |
| Tobacco | Negative |

General Definitions

The following definitions are included for the purpose of understanding the present subject matter and for constructing the appended patent claims. The abbreviations used herein have their conventional meanings within the chemical and biological arts.

While various embodiments and aspects of the present invention are shown and described herein, it will be obvious to those skilled in the art that such embodiments and aspects are provided by way of example only. Numerous variations, changes, and substitutions will now occur to those skilled in the art without departing from the invention. It should be understood that various alternatives to the embodiments of the invention described herein may be employed in practicing the invention.

The section headings used herein are for organizational purposes only and are not to be construed as limiting the subject matter described. All documents, or portions of documents, cited in the application including, without limitation, patents, patent applications, articles, books, manuals, and treatises are hereby expressly incorporated by reference in their entirety for any purpose.

Unless defined otherwise, technical and scientific terms used herein have the same meaning as commonly understood by a person of ordinary skill in the art. See, e.g., Singleton et al., DICTIONARY OF MICROBIOLOGY AND MOLECULAR BIOLOGY 2nd ed., J. Wiley & Sons (New York, NY 1994); Sambrook et al., MOLECULAR CLONING, A LABORATORY MANUAL, Cold Springs Harbor Press (Cold Springs Harbor, NY 1989). Any methods, devices and materials similar or equivalent to those described herein can be used in the practice of this invention. The following definitions are provided to facilitate understanding of certain terms used frequently herein and are not meant to limit the scope of the present disclosure.

"Patient" or "subject in need thereof" refers to a living member of the animal kingdom suffering from or who may suffer from the indicated disorder. In embodiments, the subject is a member of a species comprising individuals who may naturally suffer from the disease. In embodiments, the subject is a mammal. Non-limiting examples of mammals include rodents (e.g., mice and rats), primates (e.g., lemurs, bushbabies, monkeys, apes, and humans), rabbits, dogs (e.g., companion dogs, service dogs, or work dogs such as police dogs, military dogs, race dogs, or show dogs), horses (such as race horses and work horses), cats (e.g., domesticated cats), livestock (such as pigs, bovines, donkeys, mules, bison, goats, camels, and sheep), and deer. In embodiments, the subject is a human.

The transitional term "comprising," which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

It is understood that where a parameter range is provided, all integers within that range, and tenths thereof, are also provided by the invention. For example, "0.2-5 mg" is a disclosure of 0.2 mg, 0.3 mg, 0.4 mg, 0.5 mg, 0.6 mg etc. up to and including 5.0 mg.

As used in the description herein and throughout the claims that follow, the meaning of "a," "an," and "the" includes plural reference unless the context clearly dictates otherwise.

By, "small molecule" may be referred to broadly as an organic, inorganic or organometallic compound with a low molecular weight compound (e.g., a molecular weight of less than about 2,000 Da or less than about 1,000 Da). The small molecule may have a molecular weight of less than about 2,000 Da, a molecular weight of less than about 1,500 Da, a molecular weight of less than about 1,000 Da, a molecular weight of less than about 900 Da, a molecular weight of less than about 800 Da, a molecular weight of less than about 700 Da, a molecular weight of less than about 600 Da, a molecular weight of less than about 500 Da, a molecular weight of less than about 400 Da, a molecular weight of less than about 300 Da, a molecular weight of less than about 200 Da, a molecular weight of less than about 100 Da, or a molecular weight of less than about 50 Da.

Small molecules are organic or inorganic. Exemplary organic small molecules include, but are not limited to, aliphatic hydrocarbons, alcohols, aldehydes, ketones, organic acids, esters, mono- and disaccharides, aromatic hydrocarbons, amino acids, and lipids. Exemplary inorganic small molecules comprise trace minerals, ions, free radicals, and metabolites. Alternatively, small molecules can be synthetically engineered to consist of a fragment, or small portion, or a longer amino acid chain to fill a binding pocket of an enzyme. Typically small molecules are less than one kilodalton.

As used herein, the term "stereoisomers" refers to compounds made up of the same atoms having the same bond order but having different three-dimensional arrangements of atoms that are not interchangeable. The three-dimensional structures are called configurations. As used herein, the term "enantiomers" refers to two stereoisomers that are non-superimposable mirror images of one another. As used herein, the term "optical isomer" is equivalent to the term "enantiomer". As used herein the term "diastereomer" refers to two stereoisomers which are not mirror images but also not superimposable. The terms "racemate", "racemic mixture" or "racemic modification" refer to a mixture of equal parts of enantiomers. The term "chiral center" refers to a carbon atom to which four different groups are attached. Choice of the appropriate chiral column, eluent, and conditions necessary to effect separation of the pair of enantiomers is well known to one of ordinary skill in the art using standard techniques (see e.g. Jacques, J. et al., "Enantiomers, Racemates, and Resolutions", John Wiley and Sons, Inc. 1981).

By "alteration" is meant a change (increase or decrease) in the presence of the small molecule, e.g., Fentanyl analogue, as detected by standard methods known in the art such as those described herein. As used herein, an alteration includes a 10% or more change in presence, preferably a 25% change, more preferably a 40% change, and most preferably a 50% or greater change in the presence.

As used herein an "alteration" also includes a 2-fold or more change, for example, 5-fold, 10-fold, 20-fold, 30-fold, 40-fold, 50-fold, 100-fold, 500-fold, 1000-fold or more.

The term "sample" as used herein refers to a biological sample obtained for the purpose of evaluation in vitro. In embodiments, the sample may comprise a body fluid. In some embodiments, the body fluid includes, but is not limited to, whole blood, plasma, serum, lymph, breast milk, saliva, mucous, semen, cellular extracts, inflammatory fluids, cerebrospinal fluid, vitreous humor, tears, vitreous, aqueous humor, or urine obtained from the subject. In some aspects, the sample is a composite panel of two or more body fluids. In exemplary aspects, the sample comprises blood or a fraction thereof (e.g., plasma, serum, or a fraction obtained via leukapheresis).

A "control" sample or value refers to a sample that serves as a reference, usually a known reference, for comparison to a test sample. For example, a test sample can be taken from a test subject, and compared to samples from known conditions, e.g., a subject (or subjects) that does not have the disease (a negative or normal control), or a subject (or subjects) who does have the disease (positive control). A control can also represent an average value gathered from a number of tests or results. One of skill in the art will recognize that controls can be designed for assessment of any number of parameters. One of skill in the art will understand which controls are valuable in a given situation and be able to analyze data based on comparisons to control values. Controls are also valuable for determining the significance of data. For example, if values for a given parameter are variable in controls, variation in test samples will not be considered as significant.

For example, the method can further be a high throughput method. In aspects, a high throughput method may refer to an assay which provides for multiple candidate agents, samples or test compound to be screened simultaneously. As further described below, examples of such assays may include the use of microtiter plates that are especially convenient because a large number of assays can be carried out simultaneously, using small amounts of reagents and samples. The methods are easily carried out in a multiwell format including, but not limited to, 96-well and 384-well formats and automated.

The term "fentanyl" and "fentanyl analogue" is intended to relate to fentanyl or a pharmaceutically acceptable salt thereof, or analogue thereof. The term "equivalent to about . . . of fentanyl" is intended to relate to a specified volume, concentration, or amount of fentanyl free base provided by a volume, concentration, or amount of a salt of fentanyl. Thus the specified amount relates to the amount of fentanyl free base and not the amount of the fentanyl salt, despite the use of the salt in the composition.

As used herein, "salts" or "salt form" or "pharmaceutically accepted salts" may include base addition salts (formed with free carboxyl or other anionic groups) which are derived from inorganic bases such as, for example, sodium, potassium, ammonium, calcium, or ferric hydroxides, and such organic bases as isopropylamine, trimethylamine, 2-ethylamino-ethanol, histidine, procaine, and the like. Such salts are formed as acid addition salts with any free cationic groups and generally are formed with inorganic acids such as, for example, hydrochloric, sulfuric, or phosphoric acids, or organic acids such as acetic, citric, p-toluenesulfonic, methanesulfonic acid, oxalic, tartaric, mandelic, and the like. Salts of the disclosure may include amine salts formed by the protonation of an amino group with inorganic acids such as hydrochloric acid, hydrobromic acid, hydroiodic acid, sulfuric acid, phosphoric acid, and the like. Salts of the disclosure also include amine salts formed by the protonation of an amino group with suitable organic acids, such as p-toluenesulfonic acid, acetic acid, and the like. Additional excipients which are contemplated for use in the practice of the present disclosure are those available to those of ordinary skill in the art, for example, those found in the United States Pharmacopoeia Vol. XXII and National Formulary Vol. XVII, U.S. Pharmacopoeia Convention, Inc., Rockville, Md. (1989), the relevant contents of which is incorporated herein by reference.

EXAMPLES

The following examples illustrate certain specific embodiments of the disclosure and are not meant to limit the scope of the invention.

Embodiments herein are further illustrated by the following examples and detailed protocols. However, the examples are merely intended to illustrate embodiments and are not to be construed to limit the scope herein. The contents of all references and published patents and patent applications cited throughout this application are hereby incorporated by reference.

Example 1

In accordance with the current invention and without limitation, a presumptive kit for the detection and identification of FA's is produced by pre-wetting a cotton swab with 0.01 to 0.05 mL of *Eucalyptus citriodora* Oil or *Melaleuca alternifolia* Oil. A dry reagent test strip is produced by flexographic printing of a reagent ink solution prepared with dye:dry catalytic reagent:dissolving solvent in ratio (1:45:300). Said reagent ink solution is prepared by mixing all three components together to allow dissolution of solid to produce an homgenised. The solid support for the printed article is a TECH 12CT 300 gsm white paper card stock. The pre-wetted solvent and dry printed article are packaged individually into hermetically form fill sealed Paper/PET12 µm/AL7 µm/PE50 sachet.

Example 2

In accordance with the current invention and without limitation, a presumptive kit for the detection and identification of Cocaine is produced by pre-wetting a cotton Q-tip with 0.25 mL of *Eucalyptus* sp. Oil, said pre-wetted swab is individually packaging into a hermetically form fill sealed Paper/PET12 µm/AL7 µm/PE50 sachet. A reactive printing ink is prepared by dissolving 2.85 w % soybean drying oil, 0.28 w % TBPPEE K salt, 1.78 w % citric acid in 95.1 w % Methanol, dissolving this mixture and Flexographic printing said reactive ink to 300 gsm white paper card stock, heated air drying printed zone, guillotining into paper strips and individually packaging into a hermetically form fill sealed Paper/PET12 µm/AL7 µm/PE50 sachet.

Example 3

In accordance with the current invention and without limitation, a presumptive kit for the detection and identification of Nicotine is produced by individually packaging a Dry single tipped cotton Q-Tip, in a hermetically form fill sealed Paper/PET12 µm/AL7 µm/PE50 sachet. A reactive printing ink is prepared by dissolving 2.85 w % soybean drying oil, 0.28 w % TBPPEE K salt, 1.78 w % citric acid in 95.1 w % Methanol, dissolving this mixture and Flexographic printing said reactive ink to 300 gsm white paper card stock, heated air drying printed zone, guillotining into paper strips and individually packaging into a hermetically form fill sealed Paper/PET12 µm/AL7 µm/PE50 sachet.

While the disclosed test kit of the present disclosure has been shown and described in detail, it is obvious that this invention is not to be considered as limited to the exact form disclosed, and that changes in detail and construction may be made therein within the scope of the without departing from the spirit thereof.

REFERENCES

CN 104111283A, "Method for rapidly sensitively detecting fentanyl in blood"
CN 1031134847A "Novel method for detecting citric acid fentanyl anaesthetic"
CN 100402084C "Method for detection or quantitative determination of metabolite of fentanyl or metabolite of fentanyl analogues and kit Enzyme-linked immunosorbent assays (ELISAs)"
US 2017/0198363A1 "Compositions and methods for detection of small molecules"
EP 1312923A2 "Method and kit for detecting, or determining the quantity of, metabolites of fentanyl and metabolites of fentanyl analogues."
US 2006/0040406A1 "Narcotic analgesic tracking system"
US 2008/0190354A1 "Detection System"
U.S. Pat. No. 4,272,380 "Solvent front detection method and manufacture"
US 2010/0197516A1 "Detechip: molecular color and fluorescent sensory arrays for small molecules
U.S. Pat. No. 4,806,487 "Basic drug detection method"
WO 1998/045714/EP0983514 "A process and a test kit for heroin detection.
US 2011/0117664A1 "A reagent kit and a method for detecting and identifying a wide range of illicit drugs" [1]
[1] http://mammothem.org/wp-content/uploads/2018/03/fentanyl-analogs.pdf
[2] Mehdizadeh, A., et al. Introducing a full validated analytical procedure as an official compendial method for fentanyl transdermal patches. daru pp. 47-51, vol. 13, no. 2, 2005.
[3] Sakai, T, Ohno, S. Spectrophotometric determination of stimulant drugs in urine by color reaction with tetrabromophenolphthalein ethyl ester analytical sciences. 1986 volume 2 issue 3, pp. 275-279
[4] Nallagundla, S., et al. Analytical method development and validation of droperidol and fentanyl citrate in bulk and pharmaceutical dosage form by rp-hplc. ijpcbs 2017, 7 (3), pp. 322-326.
[5] Doyle, T. D, and Levine, J. Application of ion-pair extraction to partition chromatographic separation of pharmaceutical amines. *Anal. Chem.*, 1967, 39 (11), pp. 1282-1287
[6] Janicki, C. et. al. Specific assay methods for droperidol and fentanyl citrate in a pharmaceutical combination. jopc. vol. 57, no. 3, March 1968, pp. 451-455.
[7] Chemical warfare toxicology: vol 2: Management of poisoning. edn. Worek, F. et al. p. 289.
[8] Maruyama, Y. and Hosoya, E. Studies on the fate of fentanyl. Keio J. Med. 18:69-10, 1969.
[9] Ohta, H., et al. Studies on fentanyl and related compounds iv. chromatographic and spectrometric discrimination of fentanyl and its derivatives. Journal of Analytical Toxicology, vol. 23, July/August 1999.
[10] Armenian, P. et al. Fentanyl, fentanyl analogs and novel synthetic opioids: a comprehensive review. neuropharmacology. 2017, pp. 1-12.
[11] Drugs identification and characterization http://www.b-u.edu.eg/portal/uploads/discussed_thesis/10867623/10867623_s.pdf
[12] World health organization carfentanil critical review report agenda item 4.8 expert committee on drug dependence thirty-ninth meeting geneva, 6-10 Nov. 2017.
[13] Kangas, M., et al. (short communication) A new possible alternative colorimetric drug detection test for fentanyl. organic and medicinal chemistry international journal. vol. 4. issue 4. December 2017, pp. 1-3.
[14] Kanamori, T., et al. Aimultaneous analysis of 18 compounds of fentanyl and its analogues by tlc, gc/ms and lc/ms. japanese journal of forensic science and technology. 2016 volume 21 issue 2, pp. 139-147.
[15] hashimoto, y., et. al. forensic chemistry of alkaloids by chromatographic analysis. the alkaloids: chemistry and pharmacology. vol. 32. 1988, pp. 1-77.
[16] Choi, M, et a.l A simple device of the dry tetrabromophenolphthalein ethyl ester reagent strip for the detection of methamphetamine. Archives of pharmacal research, vol. 16, no. 3, September 1993, pp. 227-230.

[17] Agarwal, P., et al. A colorimetric method for the determination of amphetamines. Acta pharmaceutica technologica, vol. 27, no. 3, 1981, pp. 181-184.

[18] Melent'ev, A., et al. Identification and analytical properties of acetyl fentanyl metabolites. joac, 2015.

[19] Liu, C., et al. the identification and analytical characterization of 2,2'-difluorofentanyl.

[20] Helander, A., et al. Detectability of fentanyl and designer fentanyls in urine by 3 commercial fenatnyl immunoassays.

[21] Sakai, T., et al. Ion assosciation titration for the determination of local anesthetics in pharmaceuticals with tetrabromophenolphthalein ethyl ester as an indicator. anal.sci. 2001. sept. 17 (9). pp. 1105-7.

[22] Tsubouchi, M., et al. Application of one-phase endpoint change system in two-phase titration to amine drug analysis. j. pharm. sci. 1981. November 70 (11), pp. 1286-8.

[23] Sakai, T. Stepwise determination of quaternary ammonium salts aromatic amines in pharmaceuticals by ion assosciation titration. anal. sci. 2001. December 17 (12), pp. 1379-82.

[24] Szasz, G, Bang-Nguyer. Use of indicator dye tetrabromophenolphthalein ethyl ester (tbpe-k) in drug analysis. ii. study of the assosciation of tbpe-k in aqueous solutions. acta. pharm. hung. 1979. nov. 49 (6), pp. 280-8.

[25] Tsubouchi, M. and Yamamoto, Y. A new method for the colorimetric determination of acrinol base by solvent extraction with tetrabromophenolphthalein ethyl ester. chem. pharm. bull. 19 (6). 1971, pp. 1280-1284.

[26] Rio, J. and Hodnett, C. Evaluation of a colorimetric screening test for basic drugs in urine. journal of analytical toxicology, vol. 5, November/December 1981, pp. 257-259.

[27] Mount, D., et al. Adaptations of the saker-solomons test: simple, reliable colorimetric field assays for chloroquine and its metabolites in urine. bulletin of the world health organization, 67 (3): 295-30 (1989).

OTHER EMBODIMENTS

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

The patent and scientific literature referred to herein establishes the knowledge that is available to those with skill in the art. All references, e.g., U.S. patents, U.S. patent application publications, PCT patent applications designating the U.S., published foreign patents and patent applications cited herein are incorporated herein by reference in their entireties. Genbank and NCBI submissions indicated by accession number cited herein are incorporated herein by reference. All other published references, documents, manuscripts and scientific literature cited herein are incorporated herein by reference. In the case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed:

1. A portable narcotic-detection kit for detecting a narcotic compound present in a sample, the portable narcotic-detection kit comprising:
   (i) a solid support comprising a dry chemical dye and a dry catalytic reagent wherein the dry catalytic reagent is selected from the group consisting of sodium bicarbonate, sodium tetraborate, calcium carbonate, sodium hydroxide, citric acid, a salt of an organic acid, an ionic natural surfactant, an ionic synthetic surfactant, a non-ionic natural surfactant, and a non-ionic synthetic surfactant; and
   (ii) an absorbent material comprising a solvent and a surfactant; wherein the absorbent material is separate from the solid support within the portable narcotic-detection kit and the dry chemical dye is configured to produce a visible color change by undergoing a physicochemical interaction when exposed to the narcotic compound wherein the narcotic compound is selected from the group consisting of a fentanyl analogue and a narcotic containing a nitrogen heterocyclic moiety.

2. The portable narcotic-detection kit of claim 1, wherein the sample is a pure liquid, a pure gel or a pure solid powder or is a liquid, a gel or a solid powder admixed with cutting agents.

3. The portable detection kit of claim 1, wherein the dry chemical dye is a phthalein dye.

4. The portable narcotic-detection kit of claim 3, wherein the phthalein dye is selected from the group consisting of tetrabromophenolphthalein ethyl ester (TBPPEE) and a TBPPEE salt.

5. The portable narcotic-detection kit of claim 1, wherein the dry chemical dye is a diazonium dye.

6. The portable narcotic-detection kit of claim 5, wherein the diazonium dye is 4-bromobenzene diazonium tetrafluoroborate or 4-nitrobenzene diazonium tetrafluoroborate.

7. The portable narcotic-detection kit of claim 1, wherein the dry catalytic reagent is configured to increase a rate of appearance of the visible color change resulting from the physicochemical interaction between the dry chemical dye reagent and the predetermined narcotic compound.

8. The portable narcotic-detection kit of claim 1, wherein the solvent is a polar aprotic solvent or a non-polar aprotic solvent.

9. The portable narcotic-detection kit of claim 1, wherein the solvent is selected from the group consisting of benzene, hexane, an ether, toluene, xylene, pseudo cumene, cumene, s naphthalene, a turpene, a plant oil extract, a wax, a paraffin, an ether, an ester, methanol, ethanol, and propanol.

10. The portable narcotic-detection kit of claim 9, wherein the solvent is a plant oil extract selected from the group consisting of citral, an eucalyptus oil, an orange fruit oil, a seed oil, olive oil, a citrus oil, tea tree oil, and a pine oil.

11. The portable narcotic-detection kit of claim 9, wherein the plant oil extract is an eucalyptus oil.

12. The portable narcotic-detection kit of claim 1, wherein the surfactant of the absorbent material is selected from the group consisting of an anionic C10-C20 alcohol ethoxylate, cationic C10-C20 alcohol ethoxylate, a zwitterionic C10-C20 alcohol ethoxylate, a non-ionic C10-C20 alcohol ethoxylate, a fatty acid ester, an amine oxide, a sulfoxide, a phosphine oxide, a soybean oil, and a plant derived surfactant.

13. The portable narcotic-detection kit of claim 1, wherein the surfactant of the absorbent material is a C10-16 pareth-1 or sodium lauryl sulfate.

14. The portable narcotic-detection kit of claim 1, wherein the dry chemical dye is intermixed with the dry catalytic reagent.

15. The portable narcotic-detection kit of claim 14, wherein the dry chemical dye and the dry catalytic reagent form a dry chemical dye to dry catalytic reagent ratio of about 1 part of dry chemical dye per 500 parts of dry catalytic reagent by weight.

16. The portable narcotic-detection kit of claim 1, wherein the solvent is intermixed with the surfactant of the absorbent material in a solvent to surfactant ratio of about 1.5 L of solvent per 20 g of surfactant or of about 99 parts of solvent per 1 part of surfactant by weight.

* * * * *